(12) United States Patent
Hampson et al.

(10) Patent No.: US 12,054,563 B2
(45) Date of Patent: Aug. 6, 2024

(54) BINDERS AND ASSOCIATED PRODUCTS

(71) Applicants: KNAUF INSULATION SPRL, Vise (BE); KNAUF INSULATION, INC., Shelbyville, IN (US)

(72) Inventors: Carl Hampson, St. Helens (GB); Gareth Jones, Prescot (GB)

(*) Notice: Subject to any disclaimer, the term of this patent is extended or adjusted under 35 U.S.C. 154(b) by 0 days.

(21) Appl. No.: 17/890,823

(22) Filed: Aug. 18, 2022

(65) Prior Publication Data

US 2023/0056560 A1 Feb. 23, 2023

Related U.S. Application Data

(63) Continuation of application No. 16/956,040, filed as application No. PCT/EP2018/085579 on Dec. 18, 2018, now abandoned.

(30) Foreign Application Priority Data

Dec. 19, 2017 (GB) ...................................... 1721228

(51) Int. Cl.
*C08B 37/00* (2006.01)
*B01F 23/231* (2022.01)
*C08K 3/20* (2006.01)

(52) U.S. Cl.
CPC ........ *C08B 37/0006* (2013.01); *B01F 23/231* (2022.01); *C08B 37/006* (2013.01); *C08K 3/20* (2013.01)

(58) Field of Classification Search
None
See application file for complete search history.

(56) References Cited

U.S. PATENT DOCUMENTS

2007/0027283 A1 2/2007 Swift et al.
2012/0135152 A1 5/2012 Finch et al.
2013/0059075 A1 3/2013 Appley et al.

OTHER PUBLICATIONS

Office action for co-pending U.S. Appl. No. 16/956,040 (10 pages)—Apr. 18, 2022.
The Reaction Product of Hexamethylenediamine and Carbon Dioxide, Leon Segal, Applied Spectroscopy, vol. 17, Issue 1, pp. 21-22 (2 pages)—1963.
Carbon Dioxide Capture from the Air Using a Polyamine Based Regenerable Solid Absorbent, Alain Goeppert et al., J. Am. Chem. Soc, 2011, 133, pp. 20164-20167 (4 pages)—Nov. 21, 2011.
International Search Report and Written Opinion for PCT/EP2018/085579 (13 pages), mailed May 21, 2019.
Written Opinion of the Int'l Preliminary Examining Authority for PCT/EP2018/085579 (6 pages), mailed Dec. 5, 2019.
International Preliminary Report on Patentability for PCT/EP2018/085579 (13 pages), mailed Mar. 17, 2020.

*Primary Examiner* — Layla D Berry
(74) *Attorney, Agent, or Firm* — Knauf Insulation, Inc.; James K. Blodgett

(57) ABSTRACT

The present invention relates to a water-soluble binder composition comprising at least one carbohydrate component and at least one carbon dioxide reaction product comprising at least the reaction product(s) of carbon dioxide with at least one nitrogen-containing compound. It further relates to a method of its manufacture, its use, a method of manufacturing a collection of matter bound by said polymeric binder, as well as a binder solution or dispersion comprising said binder composition.

17 Claims, 4 Drawing Sheets

BINDERS AND ASSOCIATED PRODUCTS

CROSS-REFERENCE TO RELATED APPLICATIONS

This application is a continuation of U.S. application Ser. No. 16/956,040, filed Jun. 19, 2020, which is a U.S. national counterpart application of International Application Serial No. PCT/EP2018/085579, filed Dec. 18, 2018, under 35 U.S.C. § 371, which claims priority to UK Application Serial No. 1721228.3, filed Dec. 19, 2017, the disclosures of which are hereby incorporated herein by reference.

FIELD OF THE INVENTION

The present invention relates to a water-soluble binder composition, a method of its manufacture, a use of said binder composition, a method of manufacturing a collection of matter bound by a polymeric binder, and a binder solution or dispersion comprising said binder composition.

BACKGROUND

Generally, binders are useful in fabricating articles because they are capable of consolidating and/or imparting structural integrity to non- or loosely-assembled matter. For example, binders enable two or more surfaces to become united. In particular, binders may be used to produce products comprising consolidated fibers. Thermosetting binders may be characterized by being transformed into insoluble and infusible materials by means of heat, catalytic action or heat in combination with catalytic action. Examples of a thermosetting binder include a variety of phenol-aldehyde, urea-aldehyde, melamine-aldehyde, polymeric methylene diphenyl diisocyanate (p-MDI), and other condensation-polymerization materials like furane and polyurethane resins. Binder compositions containing phenolaldehyde, resorcinol-aldehyde, phenol/aldehyde/urea, phenol/melamine/aldehyde, and the like are widely used for the bonding of fibers, textiles, plastics, rubbers, and many other materials.

The mineral wool and wood board industries have historically used a phenol formaldehyde based binder, generally extended with urea. Phenol formaldehyde type binders provide suitable properties to the final products; however, desires for greater sustainability and environmental considerations have motivated the development of alternative binders that preferably neither make use of or generate formaldehyde nor generate substantial quantities of harmful byproducts during curing. They have been collectively referred to as formaldehyde-free binders. One such alternative binder is a carbohydrate based binder. Such carbohydrate based binders may be derived from reacting a carbohydrate and an acid, for example, U.S. Published Application No. 2007/0027283 and Published PCT Application WO2009/019235. Carbohydrate based binders may also be derived from reacting a carbohydrate with a polyamine, more specifically a polyamine having at least one primary amine group, in order to form polymeric carbohydrate polyamine binders. These are effective substitutes for phenol formaldehyde binders, since they possess similar or superior binding characteristics and are highly compatible to the established processes.

Carbohydrate-based binder compositions are made of relatively inexpensive precursors and are derived mainly from renewable resources. However, these binders may also require reaction conditions for curing that are substantially different from those conditions under which the traditional phenol formaldehyde binder system is cured.

Typically, the carbohydrate polyamine binders are prepared as a solution, such as an aqueous solution, and are subsequently applied onto the loosely assembled matter to be bound. The thus wetted loosely assembled matter is then, for example, heat treated, or pressed and/or compressed and then heat treated, to cure the carbohydrate polyamine binder. Nonetheless, the rather high concentration of solids in the carbohydrate polyamine binder solution is connected to a variety of disadvantages, such as quick gelling or solidification of the binder solution, as well as recrystallization of the carbohydrate component. For all concentrations of solids in the binder solution, the storage and/or transport of the said binder solution (comprising carbohydrate and polyamine) may, for certain combinations of binder components and under certain conditions, lead to undesirable gelling, which in turn leads to blockage of spray nozzles that are used to spray the binder onto a loose collection of matter prior to curing.

Accordingly, the technical problem underlying the present invention is to provide improved binder compositions, particularly carbohydrate based binders which are compatible with the established processes, are environmentally acceptable and overcome the aforementioned problems.

SUMMARY

In order to solve the above technical problem, as a first aspect, the present invention provides a water-soluble binder composition, comprising (i) at least one carbohydrate component, and (ii) at least one carbon dioxide reaction product comprising at least the reaction product(s) of carbon dioxide with at least one nitrogen-containing compound.

DETAILED DESCRIPTION

Figure 1:
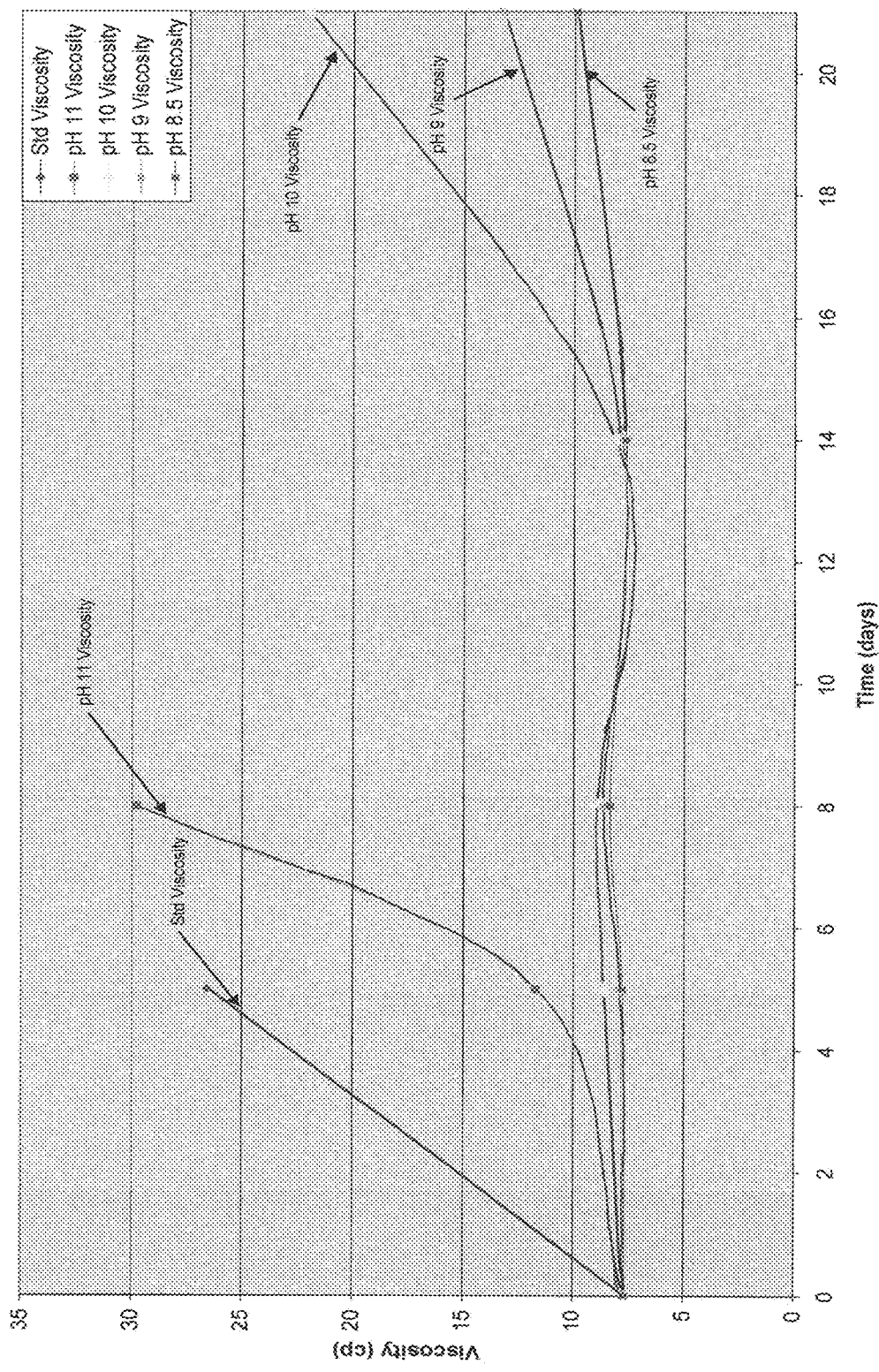
FIG. 1 shows the impact of $CO_2$ injection on the viscosity of a binder composition of the invention.

Without being bound by theory, it has been found that when bubbling carbon dioxide in a solution comprising at least one carbohydrate component and at least one nitrogen-containing component, carbamate compounds are formed which prevent or at least significantly delay further reaction of the nitrogen-containing component with other components of the composition, such as further polymerization or cross-linking. Undesirable viscosity increase of the binder composition during storage and/or shipping under non-optimal conditions is prevented or at least substantially reduced. The binder composition may thus easily be sprayed onto the loose assembly of matter and then heat treated for curing. The curing temperatures are sufficiently high to separate the dioxide bound to some of the components of the composition and thus allow the curing reaction between the carbohydrate and nitrogen containing component of the composition again. The stability of the binder composition is thus increased over extended periods of time while still substantially maintaining the curing properties and bond strength of the binder composition.

The total amount of the at least one carbohydrate component and the at least one nitrogen-containing component in the starting material to prepare the binder composition may be at least 5 wt.-%, based on the solids content or on the total dry weight of the binder composition. For example, the total amount of the at least one carbohydrate component and the at least one nitrogen-containing component may be at least 10 wt.-%, 12 wt.-%, 15 wt.-%, 20 wt.-%, 25 wt.-%, 30 wt.-%, 35 wt.-%, or 40 wt.-% up to 50 wt-%., 55 wt.-%., 60 wt-%., 65 wt-%., 70 wt-%. or 75 wt-%.

Carbon dioxide is advantageously injected in an amount such as to reach approx. stoichiometric reaction with the nitrogen-containing component.

Term "water-soluble" as used herein is not specifically restricted and includes all grades of water-solubility of the binder composition as defined above. In particular, the term "water-soluble" includes water-solubility at 20° C. of 100 g/l or more, 150 g/l or more, 200 g/l or more, or 250 g/l or more. For example, the term "water-soluble" may include a water-solubility of the binder composition as defined above of 300 g/l or more, 400 g/l or more, 500 g/l or more or 600 g/l or more (at 20° C.). Also virtual infinite water-solubility may be regarded to be within the scope of the present invention.

The viscosity of said aqueous binder solution should preferably not increase by more than 500 cP when left to stand at 20° C. for 12 hours, 24 hours, 48 hours, 72 hours or 96 hours. According to a further preferred embodiment, the viscosity of said aqueous solution should not increase by more than 500 cP within a week, 10 days, 12 days or two weeks. Longer periods, such as three or four weeks, or even two, three or more months, where the viscosity will not increase by more than 500 cP are even more preferable.

According to a further embodiment, the amount by which the viscosity increases within the first 12 hours when leaving an 70 wt.-% aqueous solution of the binder composition to stand at 20° C. should preferably not exceed 450 cP, or 400 cP or even 350 cP. Preferred increases in viscosity include increases of 300 cP or less, 280 cP or less, 250 cP or less and 200 cP or less.

According to the present invention, the above-defined time periods and increases in viscosity are not limited to the examples mentioned above and may be freely combined. For example, preferably, the above-mentioned 70 wt.-% aqueous solution of the binder composition does not increase in viscosity by more than 300 cP within the first 48 hours after its preparation, or more than 400 cP within two weeks after its preparation. Generally, if the viscosity of a respective aqueous solution becomes too high, e.g. caused by gelling, the composition may become unusable.

According to a further embodiment, the above-defined binder composition is capable of allowing the reaction between the carbohydrate component and the nitrogen-containing component after degassing the carbon dioxide. It is then also capable of allowing the reaction of the components with a crosslinker, to obtain a polymeric binder. For example, this polymeric binder may contain high molecular weight melanoidins as Maillard reaction products which are essentially water-insoluble.

For example, the one or more melanoidins as defined above may contain the following generic structural motifs:

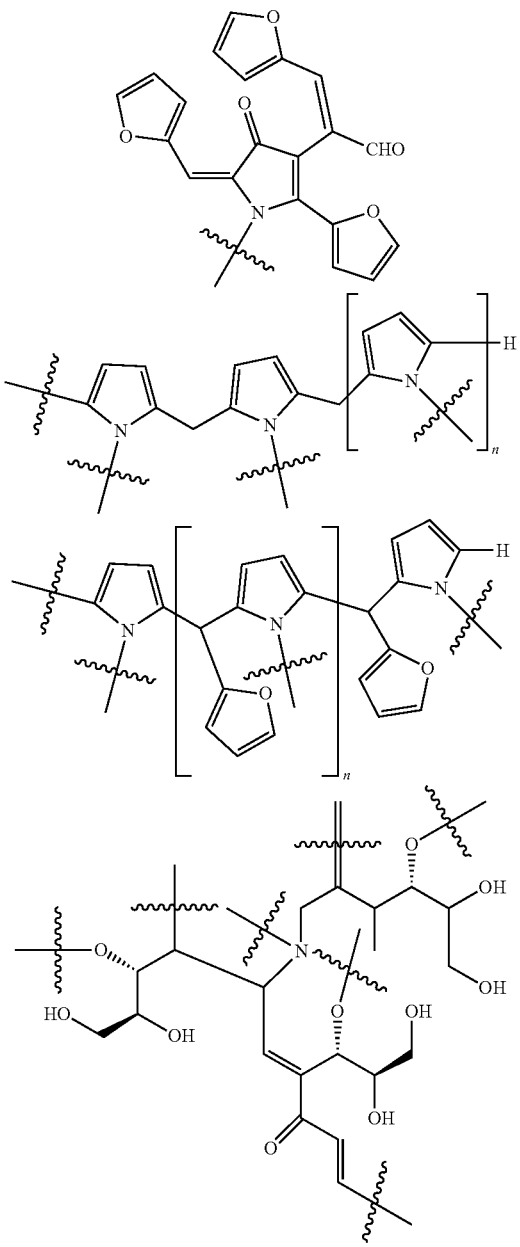

wherein n is an integer of at least 1.

Herein, the term "crosslinker" is not particularly restricted and includes any chemical or physical means to crosslink the binder composition to yield a polymeric binder suitable for binding loosely assembled matter, such as mineral fibers. According to a specific embodiment of the present invention, the crosslinker may be the same nitrogen-containing component which has been reacted with the carbohydrate component, or may be a different nitrogen-containing component.

For example, a binder composition of the invention may be prepared by mixing a carbohydrate component with hexamethylenediamine (NMDA) and adding $CO_2$. Subsequently, further hexamethylenediamine may be added to the binder composition to achieve the high grade of polymerization required in the respective polymerized application. A further example includes the case where the invention binder composition is prepared by mixing a carbohydrate component with an aqueous solution of ammonia and adding $CO_2$, and for the final curing additional hexamethylenediamine is added.

However, the crosslinker is not limited to the nitrogen-containing components defined herein and includes, as an example, Lewis acids, isocyanates, blocked isocyanates, epoxides, blocked epoxides, carbonyl-containing compounds (aldehydes, ketones, i.e. glyoxal) and organic carbonates. Specific examples of the crosslinker include citric acid, polycarboxylic acids and anhydrides (e.g. succinic acid, maleic anhydride, tetra- and hexahydrophthalic anhydrides, styrene-maleic-anhydride copolymers), solutions of polycarboxylic acid and anhydride derivatives (e.g. ammonium salts thereof).

According to a further embodiment of the above-defined binder composition, the ratio of the total carbonyl groups in the carbohydrate component to total reactive nitrogen-containing groups in the nitrogen-containing component is 5:1 to 1:5. For example, the ratio of carbonyl groups to reactive nitrogen-containing groups may be 5:1 to 1:4.5, 5:1 to 1:4, 5:1 to 1:3.5, 5:1 to 1:3, 5:1 to 1:2.5, 5:1 to 1:2, 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:5, 3.5:1 to 1:5, 3:1 to 1:5, 2.5:1 to 1:5, 2:1 to 1:5, 1.5:1 to 1:5, 1:1 to 1:5, 0.8:1 to 1:5 and 0.5:1 to 1:5. According to the present invention, the upper and lower borders of the above-mentioned ratios may be freely combined.

Herein, the term "reactive nitrogen-containing group" is not particularly restricted and includes any nitrogen-containing groups in the nitrogen-containing component which are capable of reacting with the carbohydrate component under relevant curing conditions. Specifically, examples of such reactive nitrogen-containing groups include primary, secondary, tertiary and quaternary amine groups, amide groups, imine and imide groups, as well as cyanate and isocyanate groups.

Herein, the term "carbohydrate component" is not specifically restricted and generally includes any carbohydrate compound which is capable of reacting with a nitrogen-containing component, under relevant curing conditions.

According to one embodiment of the above-defined binder, the at least one carbohydrate component is selected from the group consisting of monosaccharides, disaccharides, polysaccharides or a reaction product thereof.

Preferably, the carbohydrate component is or comprises a reducing sugar and/or a component which yields a reducing sugar in situ. As used herein, the term "reducing sugar" indicates one or more sugars that contain aldehyde or keto-groups, or that can isomerize, i.e., tautomerize, to contain aldehyde or keto-groups, which groups may be oxidized with, for example, Cu-ions to afford carboxylic acids. According to the present invention, any such carbohydrate component may be optionally substituted, such as with hydroxy, halo, alkyl, alkoxy, and the like. In any such carbohydrate component, one or more chiral centers may be present, and both possible optical isomers at each chiral center are included in the invention described herein. Further, it is also to be understood that various mixtures, including racemic mixtures, or other diastereomeric mixtures of the various optical isomers of any such carbohydrate component, as well as various geometric isomers thereof, may be used in one or more embodiments described herein.

Non-reducing sugars, for instance sucrose, may be used as the or part of the carbohydrate component, especially when capable and/or subjected to in-situ conversion to a reducing sugar. Further, it is also understood that a monosaccharide, a disaccharide, or a polysaccharide may be partially reacted with a precursor to form a carbohydrate reaction product. To the extent that the carbohydrate reaction product is derived from a monosaccharide, a disaccharide, or a polysaccharide, and maintains similar reactivity with the nitrogen-containing component to form reaction products similar to those of a monosaccharide, a disaccharide, or a polysaccharide with a nitrogen-containing component, the carbohydrate reaction product is within the scope of term carbohydrate component.

Preferably, any carbohydrate component should be sufficiently nonvolatile to maximize its ability to remain available for reaction with the nitrogen-containing component. The carbohydrate component may be a monosaccharide in its aldose or ketose form, including a triose, a tetrose, a pentose, a hexose, or a heptose; or a polysaccharide; or combinations thereof. For example, when a triose serves as the carbohydrate component, or is used in combination with other reducing sugars and/or a polysaccharide, an aldotriose sugar or a ketotriose sugar may be utilized, such as glyceraldehyde and dihydroxyacetone, respectively. When a tetrose serves as the carbohydrate component, or is used in combination with other reducing sugars and/or a polysaccharide, aldotetrose sugars, such as erythrose and threose; and ketotetrose sugars, such as erythrulose, may be utilized. When a pentose serves as the carbohydrate component, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, may be utilized. When a hexose serves as the carbohydrate component, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, may be utilized. When a heptose serves as the carbohydrate component, or is used in combination with other reducing sugars and/or a polysaccharide, a ketoheptose sugar such as sedoheptulose may be utilized. Other stereoisomers of such carbohydrate components not known to occur naturally are also contemplated to be useful in preparing the binder compositions as described herein. In one embodiment, the carbohydrate component is high fructose corn syrup (HFCS).

As mentioned above, the carbohydrate component may be polysaccharide. For example, the carbohydrate component may be polysaccharide with a low degree of polymerization and includes e.g. molasses, starch, cellulose hydrolysates, or mixtures thereof. According to a specific example, the carbohydrate component is a starch hydrolysate, a maltodextrin, or a mixture thereof. While carbohydrates of higher degrees of polymerization may not be preferable, they may none the less be useful within the scope of the present invention by in-situ depolymerization.

Furthermore, according to the present invention, the carbohydrate component may be used in combination with a non-carbohydrate polyhydroxy reactant. Examples of non-carbohydrate polyhydroxy reactants which can be used in combination with the carbohydrate component include, but are not limited to, trimethylolpropane, glycerol, pentaerythritol, polyvinyl alcohol, partially hydrolyzed polyvinyl acetate, fully hydrolyzed polyvinyl acetate, and mixtures thereof. For example, the non-carbohydrate polyhydroxy reactant is sufficiently nonvolatile to maximize its ability to remain available for reaction with a monomeric or polymeric polyamine. Moreover, according to the present invention, the hydrophobicity of the non-carbohydrate polyhydroxy reactant may be a factor in determining the physical properties of a binder prepared as described herein. Other co-reacting compounds, for example, like carbonyl-containing compounds—aldehydes, ketones, carboxylic acids and anhydrides, may be used.

In a preferred embodiment of the above-defined binder composition, the at least one carbohydrate component is selected from the group consisting of ribose, arabinose, xylose, lyxose, glucose (dextrose), mannose, galactose, allose, altrose, talose, gulose, idose, fructose, psicose, sorbose, dihydroxyacetone, sucrose and tagatose, as well as mixtures thereof.

Further, herein the expression "nitrogen-containing component" is not particularly limited and includes any chemical compound, or mixture of compounds, which contain at least one nitrogen atom and which is capable of reacting with the at least one carbohydrate component under curing conditions.

According to one embodiment, in the binder composition as defined above, the at least one nitrogen-containing component is $NH_3$, an inorganic amine or an organic amine comprising at least one primary amine group, as well as salts thereof. For example, as the nitrogen-containing component $NH_3$ may be used as such (e.g. in form of an aqueous solution), as well as any type of inorganic and organic ammonium salts, as long as these salts are capable of reacting with the carbohydrate component defined above. Specific examples of inorganic ammonium salts include ammonium sulfate ($AmSO_4$), ammonium phosphate, ammonium chloride, and ammonium nitrate.

According to the present invention, the nitrogen-containing component may be a polyamine. Herein, the term "polyamine" includes any organic compound having two or more amine groups, which may independently be substituted. As used herein, a "primary polyamine" is an organic compound having two or more primary amine groups ($—NH_2$). Within the scope of the term primary polyamine are those compounds which can be modified in situ or isomerize to generate a compound having two or more primary amine groups ($—NH_2$).

For example, the polyamine may be a primary polyamine. According to one embodiment of the present invention, the primary polyamine may be a molecule having the formula $H_2N-Q-NH_2$, wherein Q is an alkyl, cycloalkyl, heteroalkyl, or cycloheteroalkyl, each of which may be optionally substituted. For example, Q may be an alkyl group selected from a group consisting of $C_2$-$C_{24}$, an alkyl selected from a group consisting of $C_2$-$C_9$, an alkyl selected from a group consisting of $C_3$-$C_7$. According to a preferred embodiment, Q is a $C_6$ alkyl. According to another embodiment, Q may be a cyclohexyl, cyclopentyl or cyclobutyl, or a benzyl group.

According to another embodiment of the present invention, the primary polyamine may comprise a triprimary triamine having spacer groups between each of three primary amines. As used herein, a triprimary triamine is an organic compound having three and only three amines, each of which amine is a primary amine ($—NH_2$). Accordingly, in concert with the instant embodiment of the present invention, the triprimary triamine(s) may be selected from triprimary triamine(s) having spacer groups between each of the three primary amines which spacer groups consist of carbon chains; triprimary triamine(s) having spacer groups between each of the three primary amines wherein each spacer group has a spacer length which is less than or equal to 12 polyvalent atoms; and triprimary triamine(s) having a total number of polyvalent atoms which is less than or equal to 23. Accordingly, a triprimary triamine having spacer groups between each of the three primary amines which spacer groups consist of carbon chains means that the spacer groups consists only of carbon atoms bonded to hydrogen atoms or to other carbon atoms.

Illustratively, triprimary triamine(s) may be selected from the group consisting of triaminodecanes, triaminononanes, notably 4-(aminomethyl)-1,8-octanediamine, triaminooctanes, triaminoheptanes, notably 1,4,7-triaminoheptane, triaminohexanes, notably 1,3,6-triaminohexane, triaminopentanes, and including isomers and combination thereof.

As used herein, the term "alkyl" includes a chain of carbon atoms, which may optionally be branched. As used herein, the terms "alkenyl" and "alkynyl" independently include a chain of carbon atoms, which may optionally be branched, and include at least one double bond or triple bond, respectively. It is to be understood that alkynyl may also include one or more double bonds. It is to be further understood that alkyl is advantageously of limited length, including $C_1$-$C_{24}$, $C_1$-$C_{12}$, $C_1$-$C_6$, and $C_1$-$C_4$. It is to be further understood that alkenyl and/or alkynyl may each be advantageously of limited length, including $C_2$-$C_{24}$, $C_2$-$C_{12}$, $C_2$-$C_8$, $C_2$-$C_6$, and $C_2$-$C_4$. In particular, shorter alkyl, alkenyl, and/or alkynyl groups may add less hydrophilicity to the compound and accordingly will have different reactivity towards the carbohydrate component and solubility in a binder solution.

As used herein, the term "cycloalkyl" includes a chain of carbon atoms, which may optionally be branched, where at least a portion of the chain is cyclic. Moreover, according to the present invention it is to be noted that the term "cycloalkylalkyl" is regarded as a subset of cycloalkyl, and that the term "cycloalkyl" also includes polycyclic structures. For example, such cycloalkyls include, but are not limited to, cyclopropyl, cyclopentyl, cyclohexyl, 2-methylcyclopropyl, cyclopentyleth-2-yl, adamantyl, and the like. As used herein, the term "cycloalkenyl" includes a chain of carbon atoms, which may optionally be branched, and includes at least one double bond, where at least a portion of the chain is cyclic. According to the present invention, said at least one double bond may be in the cyclic portion of cycloalkenyl and/or the non-cyclic portion of cycloalkenyl. Moreover, it is to be understood that cycloalkenylalkyl and cycloalkylalkenyl are each regarded as subsets of cycloalkenyl. Moreover, according to the present invention "cycloalkyl" may be polycyclic. Examples of such cycloalkenyls include, but are not limited to, cyclopentenyl, cyclohexylethen-2-yl, cycloheptenylpropenyl, and the like. Furthermore, the chain forming cycloalkyl and/or cycloalkenyl is advantageously of limited length, including $C_3$-$C_{24}$, $C_3$-$C_{12}$, $C_3$-$C_8$, $C_3$-$C_6$, and $C_5$-$C_6$. According to the present invention, shorter alkyl and/or alkenyl chains forming cycloalkyl and/or cycloalkenyl, respectively, may add less lipophilicity to the compound and accordingly will have different behavior.

As used herein, the term "heteroalkyl" includes a chain of atoms that includes both carbon and at least one heteroatom, and is optionally branched. Examples of such heteroatoms include nitrogen, oxygen, and sulfur. In certain variations, said hetero-atoms also include phosphorus, and selenium. In one embodiment, a heteroalkyl is a polyether. As used herein, the term "cycloheteroalkyl" including heterocyclyl and heterocycle, includes a chain of atoms that includes both carbon and at least one heteroatom, such as heteroalkyl, and may optionally be branched, where at least a portion of the chain is cyclic. Similarly, examples of cycloheteroalkyl include, but are not limited to, tetrahydrofuryl, pyrrolidinyl, tetrahydropyranyl, piperidinyl, morpholinyl, piperazinyl, homopiperazinyl, quinuclidinyl, and the like.

Herein, the term "optionally substituted" includes the replacement of hydrogen atoms with other functional groups on the radical that is optionally substituted. Such other functional groups illustratively include, but are not limited to, amino, hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof, and the like. Illustratively, any of amino, hydroxyl, thiol, alkyl, haloalkyl, heteroalkyl, aryl, arylalkyl, arylheteroalkyl, and/or sulfonic acid is optionally substituted.

For example, the primary polyamine may be a diamine, triamine, tetraamine, or pentamine. According to one embodiment, the polyamine is a triamine selected from a diethylenetriamine, 1-piperazineethaneamine, or bis(hexamethylene)triamine. In another embodiment, the polyamine is a tetramine, for example triethylenetetramine. In another embodiment, the polyamine is a pentamine, for example tetraethylenepentamine.

One aspect of the primary polyamine is that it may possess low steric hindrance. For example, 1,2-diaminoethane, 1,4-diaminobutane, 1,5-diaminopentane, 1,6-diaminohexane, 1,12-diaminododecane, 1,4-diaminocyclohexane, 1,4-diaminobenzene, diethylenetriamine, triethylenetetramine, tetraethylenepentamine, 1-piperazineethaneamine, 2-methyl-pentamethylenediamine, 1,3-pentanediamine, and bis(hexamethylene)triamine, as well as 1,8-diaminooctane have low steric hindrance within the scope of the present invention. According to a preferred embodiment of the binder composition as defined above, the nitrogen-containing component is the primary polyamine 1,6-diaminohexane (hexamethylenediamine, HMDA). In a further embodiment the nitrogen-containing component is 1,5-diamino-2-methylpentane (2-methyl-pentamethylenediamine).

In another embodiment, the nitrogen-containing component is the primary polyamine polyether-polyamine. For example, according to the present invention, said polyether-polyamine is a diamine or a triamine. In one embodiment, the polyether-polyamine is a trifunctional primary amine having an average molecular weight of 440 known as Jeffamine T-403 Polyetheramine (Huntsman Corporation). EDR-104 and EDR-148 (Huntsman) may also be used.

In a further embodiment, the nitrogen-containing component may include a polymeric polyamine. For example, polymeric polyamines within the scope of the present invention include chitosan, polylysine, polyethylenimine, poly(N-vinyl-N-methyl amine), polyaminostyrene and polyvinylamines. In a specific example, the nitrogen-containing component comprises a polyvinyl amine. As used herein, the polyvinyl amine can be a homopolymer or a copolymer.

The term "solvent" used herein is not particularly restricted and includes any solvent which may be used to carry out a reaction between the carbohydrate component and the nitrogen-containing component. For example, the solvent may be water, an organic solvent or mixtures thereof. Examples of organic solvents include alcohols, ethers, esters, ketones, aldehydes, alkanes and cycloalkanes. Preferably, the solvent consists of or consists essentially of water.

A further embodiment of the present invention relates to the above-defined binder composition, wherein the weight ratio between the carbohydrate component and the carbon dioxide reaction product with said nitrogen-containing component is 0.5:1 to 30:1. Examples of further molar ratios include ratios of 0.7:1 to 25:1, 1:1 to 22:1, 1.5:1 to 20:1, 2:1 to 15:1, 2.5:1 to 10:1 or 3:1 to 8:1. However, according to the present invention, the molar ratio of carbohydrate component to nitrogen-containing component is not limited to said ranges and the above upper and lower borders may be freely combined.

Depending on its chemical composition, the binder composition of the present invention may be used as such, i.e. by applying it to loosely assembled matter and curing it, for example through application of heat and/or radiation to arrive at a polymeric binder. In the course of the curing, the carbon dioxide bound to components of the binder composition is substantially eliminated, thus allowing for proper curing and/or cross-linking reactions.

In a further embodiment, the binder composition may be used by subsequently adding a crosslinker, applying the mixture onto the loosely assembled matter and curing the mixture, thus forming a highly crosslinked polymeric binder having similar or even improved properties over the known carbohydrate-based binders. In this case, the binder composition of the present application may advantageously be prepared, stored and/or shipped, and used later and/or at a different place by adding a crosslinker, to complete the final binder composition.

If not stated otherwise, any of the above definitions also apply to the further aspects and embodiments of the present invention described below.

A further aspect of the present invention relates to a method of manufacturing the binder composition as defined above, comprising the steps:
(i) providing at least one carbohydrate component,
(ii) providing at least one nitrogen-containing component,
(iii) providing carbon dioxide,
(iv) mixing in a solvent the carbohydrate component(s) and the nitrogen-containing component(s), and cooling at room temperature, and
(v) bubbling carbon dioxide into the mixture obtained in step (iv); or
(i') providing at least one carbohydrate component,
(ii') providing at least one nitrogen-containing component,
(iii') providing carbon dioxide,
(iv') reacting the carbon dioxide with the nitrogen-containing component, and
(v') mixing in a solvent the carbohydrate component(s) and the reaction product of (iv').

According to the present invention, carbon dioxide may be bubbled into the mixture at a rate of 0.5 to 50 w % based on the total weight of the binder composition, or at a rate of 1 to 45 w %, or at a rate of 1 to 40 w %, or 1 to 35 w %, or 1 to 30 w %, or 1 to 25 w %, or 1 to 20 w %, or 1 to 15 w %, or 1 to 10 w %, or 1 to 5 w %. Alternatively, "soda water" (carbonic acid) may be used to supply part of the carbon dioxide or may constitute the entire source of carbon dioxide in the binder composition. In another variant of the present invention, a preformed carbamate of the at least one nitrogen-containing component may be utilized.

In a preferred embodiment, the preparation of the binder composition is carried out in a solvent, such as water, to directly yield a binder solution usable for storage, shipping or as a basis for preparing the final binder composition. For example, the invention binder composition may be prepared in a concentrated aqueous solution of the carbohydrate component and nitrogen-containing component. The thus obtained concentrated binder solution may then be used, for example, at a later time and/or a different place, e.g. by dilution and addition of a crosslinker, as an effective binder for consolidating loosely assembled matter.

According to a preferred embodiment of the present invention, the above steps (i) to (v) or (i') to (v') are carried out while the carbohydrate component(s) and nitrogen-containing component(s) are not in contact with a collection of matter which is to be bound by a polymeric binder.

According to a further embodiment, the viscosity of the solution or dispersion during step (iv) of mixing the carbohydrate component(s) and the nitrogen-containing component(s) does not increase by more than 300 cP, when determined at 20° C. and a starting concentration of 70 wt.-% total carbohydrate and nitrogen-containing components present before said step (iv). For example, the viscosity does not increase by more than 275 cP, more than 250 cP, more than 225 cP, more than 200 cP, more than 175 cP, more than 150 cP, more than 100 cP, more than 75 cP, or more than 50 cP.

The mixing step (iv) or (v') may be carried out at or substantially at atmospheric pressure, for example in an open reaction vessel. Step (v) may preferably be carried out in a closed reaction vessel, at atmospheric pressure or at a pressure above atmospheric pressure.

As mentioned before, a sufficient quantity of carbon dioxide is bubbled into the solution in order to obtain an approx. stoichiometric reaction with the nitrogen-containing component. Practically, 0.5 to 50 w % $CO_2$, preferably more than 1 w %, more preferably more than 6 w %, even more preferably more than 7 w % $CO_2$, and up to 40 w %, preferably up to 35 w %, more preferably up to 25 w % $CO_2$, may be bubbled into the reaction mixture obtained after mixing step (iv). The addition of carbon dioxide lowers the pH of the mixture. In one preferred embodiment, 1 to 2 w % $CO_2$ is bubbled into to the mixture obtained at the end of step (iv).

According to another aspect, the present invention relates to a water-soluble binder composition obtainable by the method as defined above.

For example, one embodiment relates to the invention binder composition as defined above, wherein said binder-composition is obtainable by mixing in a solvent the at least one carbohydrate component with the at least one nitrogen-containing component at a temperature of at least 10° C. for a period of at least 5 minutes and thereafter injecting carbon dioxide into the obtained product mixture.

According to another aspect, the present invention relates to a use of the water-soluble binder composition as defined above in the manufacture of a product comprising a collection of matter bound by a polymeric binder.

Herein, the term "collection of matter" is not particularly restricted and includes any collection of matter which comprises fibers selected from the group consisting of mineral fibers (including slag wool fibers, stone wool fibers, glass fibers), aramid fibers, ceramic fibers, metal fibers, carbon fibers, polyimide fibers, polyester fibers, rayon fibers, brake lining fibers and cellulosic fibers. Further examples of a collection of matter include: particulates such as coal, sand; cellulosic fibers; wood shavings, sawdust, wood pulp, ground wood, wood chips, wood strands, wood layers; other natural fibers such as jute, flax, hemp, and straw; wood veneers; facings; wood facings, particles, woven or non-woven materials (e.g. comprising fibers, notably of the type(s) referred to above).

A further aspect of the present invention relates to a method of manufacturing a collection of matter bound by a polymeric binder comprising the steps:
(i) providing a collection of matter,
(ii) providing the above-defined binder composition, or a binder composition obtained by the method as defined above, in a solvent to obtain a solution or dispersion,
(iii) applying the solution or dispersion obtained in step (ii) to the collection of matter, and
(iv) applying energy to the collection of matter containing said solution or dispersion to degas carbon dioxide and cure the binder composition.

The step (iv) of applying energy to the collection of matter as defined in the above method is not particularly restricted and includes, for example, heating in an oven at a temperature of 100° C. to 350° C., depending on the type of matter, the amount of binder and other conditions.

According to one embodiment of the above method, in step (ii) a crosslinker is added to the invention binder composition as defined above or the invention binder composition obtained by the method as defined above, or the solution or dispersion thereof.

According to a further embodiment of the above-defined method of manufacturing a collection of matter, prior to the step of applying the solution or dispersion obtained in step (ii) to the collection of matter, the collection of matter is substantially free of binder.

A further aspect of the present invention relates to a binder solution or dispersion comprising in a solvent the invention binder composition as defined above and a cross-linker. In the alternative, the invention relates to the combination, possibly in different containers, of a binder solution or dispersion comprising in a solvent the invention binder composition as defined above, and a cross-linker.

The invention binder composition solution or dispersion, particularly in the state applied to the material to be bound, may comprise:
at least 5%, 10%, 12%, or 15% solids and/or
less than 75%, 70%, 65% or 60% (particularly in the case of wood board applications) or less than 50%, 40% or 20% solids (particularly in the case of mineral fibre insulation applications) particularly determined as bake out solids by weight after drying at 140° C. for 2 hours.

Binders in accordance with the present invention may be used as binders e.g. in articles selected from the group consisting of: thermal insulation materials; mineral wool insulation (including glass wool insulation and stone wool insulation); woven and non-woven textile veils; woven and non-woven mineral fiber veils; wood boards; fiberboards; wood particle boards; chip boards; orientated strand board; medium density fiberboards; plywood; high pressure laminates; and sand cores.

The quantity of binder in the finished product, particularly in the case of mineral wool insulation, may be:
Greater than: 1%, 2%, 2.5%, 3%, 3.5% or 4%; and/or
Less than: 20%, 15%, 10% or 8% measured by dry weight of the finished product.
The quantity of binder for mineral wool insulation is typically measured by loss on ignition (LOI).
Where the application is for mineral wool insulation, latter may have one or more of the following characteristics:
A density greater than 5, 8 or 10 kg/m$^3$;
A density less than 200, 180 or 150 km/m$^3$
Comprise glass wool fibres and have a density greater than 5, 8 or 10 kg/m$^3$ and/or less than 80, 60 or 50 kg/m$^3$;
Comprise stone wool fibres and have a density greater than 15, 20 or 25 kg/m$^3$ and/or less than 220, 200 or 180 kg/m$^3$;
A thermal conductivity A of less than 0.05 W/mK and/or greater than 0.02 W/mK Comprise less than 99% by weight and/or more than 80% by weight mineral fibres.

A thickness of greater than 10 mm, 15 mm or 20 mm and/or less than 400 mm, 350 mm or 300 mm.

Where the product is wood board product, it may have one or more of the following characteristics:

Dimensions of at least 50 cm×80 cm, preferably at least 1 m×2 m

Thickness of at least 11 mm, 12 mm or 15 mm

A curing time of less than 25, 15, 12 or 10 minutes

An internal bond strength measured in accordance with EN319 of at least: 0.4 N/mm$^2$ or 0.45 N/mm$^2$ (particularly for particle board or fibre boards) or measured in accordance with EN300 of at least 0.28 N/mm$^2$ (particularly for orientated strand board)

A thickness swelling after 24 hours in water at 20° C. according to EN317 of less than 12%, preferably less than 10%

A water absorption after 24 hours in water at 20° C. of less than 40%, preferably less than 30%

A modulus of elasticity according to EN310 of at least: 1800 N/mm$^2$ (particularly for particle board or fibre boards) or 2500 N/mm$^2$ (particularly for orientated strand board) or 3500 N/mm$^2$ or 4800 N/mm$^2$ A bending strength (MOR) of at least: 14 N/m$^2$ (particularly for particle board or fibre boards) or 18 N/mm$^2$ (particularly for orientated strand board) or 20 N/mm$^2$ or 28 N/mm$^2$. Wax as an additive, for example in the range 0.1 to 2% by weight, preferably 0.5 to 1% by weight A binder content (weight of dry resin to weight of dry wood particles) in the range 8 to 18% by weight, preferably 10 to 16% by weight, more preferably 12 to 14% by weight.

Be cured in a press, particularly between plates or platens having a temperature of greater than 180° C. or 200° C. and/or less than 280° C. or 260° C.

Various additives can be incorporated into the binder composition. These additives give the binders of the present invention additional desirable characteristics. For example, the binder may include a silicon-containing coupling agent. Many silicon-containing coupling agents are commercially available from the Dow-Corning Corporation, Evonik Industries, and Momentive Performance Materials. Illustratively, the silicon-containing coupling agent includes compounds such as silylethers and alkylsilyl ethers, each of which may be optionally substituted, such as with halogen, alkoxy, amino, and the like. In one variation, the silicon-containing compound is an amino-substituted silane, such as, gamma-aminopropyltriethoxy silane (SILQUEST A-1101; Momentive Performance Materials, Corporate Headquarters: 22 Corporate Woods Boulevard, Albany, NY 12211 USA). In another variation, the silicon-containing compound is an amino-substituted silane, for example, aminoethylaminopropyltrimethoxy silane (Dow Z-6020; Dow Chemical, Midland, MI; USA). In another variation, the silicon-containing compound is gamma-glycidoxypropyltrimethoxysilane (SILQUEST A-187; Momentive). In yet another variation, the silicon-containing compound is an aminofunctional oligomeric siloxane (HYDROSIL 2627, Evonik Industries, 379 Interpace Pkwy, Parsippany, NJ 07054).

The silicon-containing coupling agents are typically present in the binder in the range from about 0.1 percent to about 1 percent by weight based upon the dissolved binder solids (i.e., about 0.05% to about 3% based upon the weight of the solids added to the aqueous solution). These silicone containing compounds enhance the ability of the binder to adhere to the matter the binder is disposed on, such as glass fibers Enhancing the binder's ability to adhere to the matter improves, for example, its ability to produce or promote cohesion in non- or loosely-assembled substance(s).

In another illustrative embodiment, a binder of the present invention may include one or more corrosion inhibitors. These corrosion inhibitors prevent or inhibit the eating or wearing away of a substance, such as, metal caused by chemical decomposition brought about by an acid. When a corrosion inhibitor is included in a binder of the present invention, the binder's corrosivity is decreased as compared to the corrosivity of the binder without the inhibitor present. In one embodiment, these corrosion inhibitors can be utilized to decrease the corrosivity of the mineral fiber-containing compositions described herein. Illustratively, corrosion inhibitors include one or more of the following, a dedusting oil, or a monoammonium phosphate, sodium metasilicate pentahydrate, melamine, tin (II) oxalate, and/or methylhydrogen silicone fluid emulsion. When included in a binder of the present invention, corrosion inhibitors are typically present in the binder in the range from about 0.5 percent to about 2 percent by weight based upon the dissolved binder solids.

Binders in accordance with the present invention are preferable thermosetting binders; they may be formaldehyde free or substantially formaldehyde free binders. They are preferably applied in liquid form.

The accompanying Figures show:

FIG. 1: the impact of $CO_2$ injection on the viscosity of a binder composition of the invention.

Figure 2:
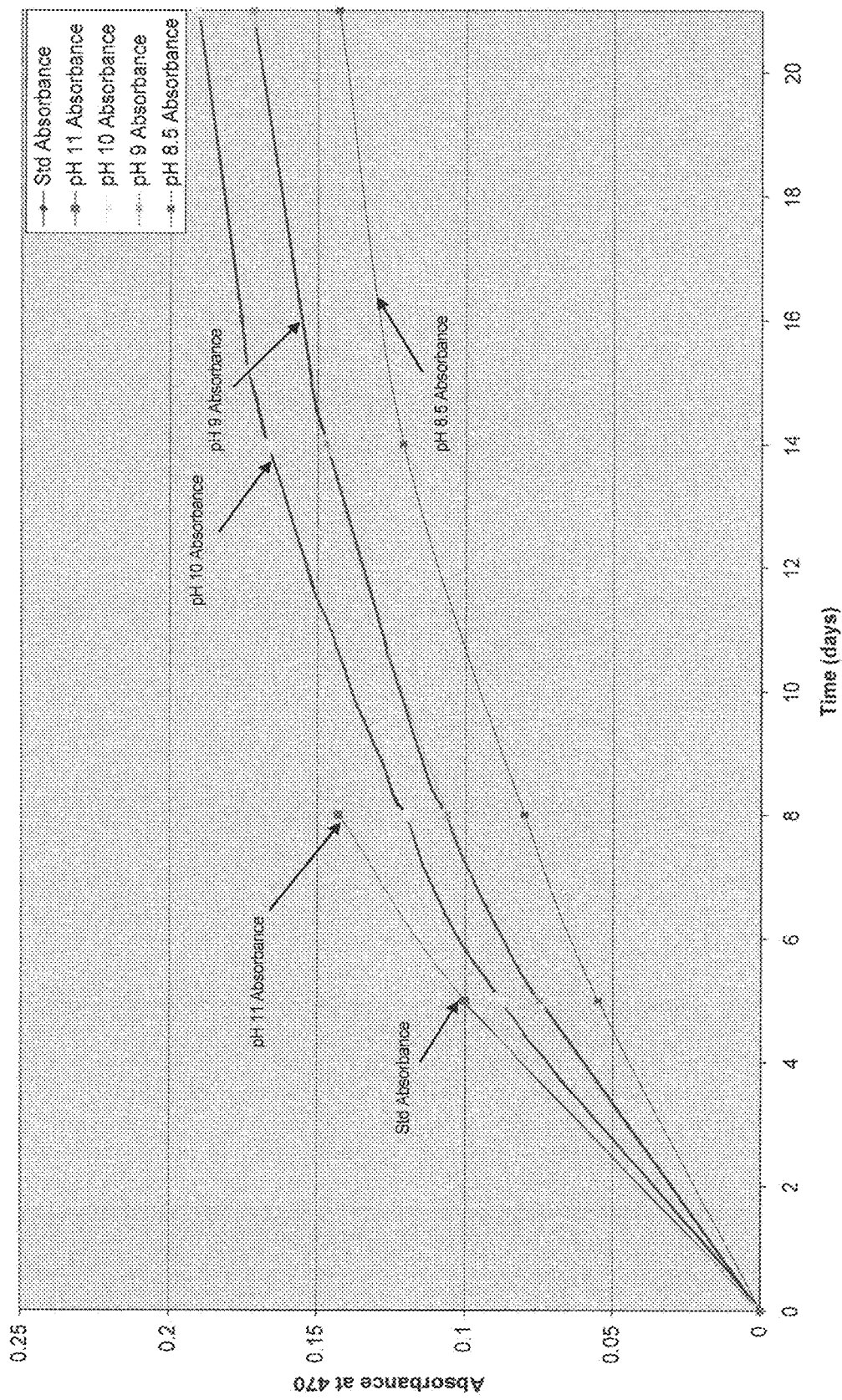
FIG. 2 shows the effect of $CO_2$ injection on the browning of a binder composition of the invention.

FIG. 2: the effect of $CO_2$ injection on the browning of a binder composition of the invention.

Figure 3:
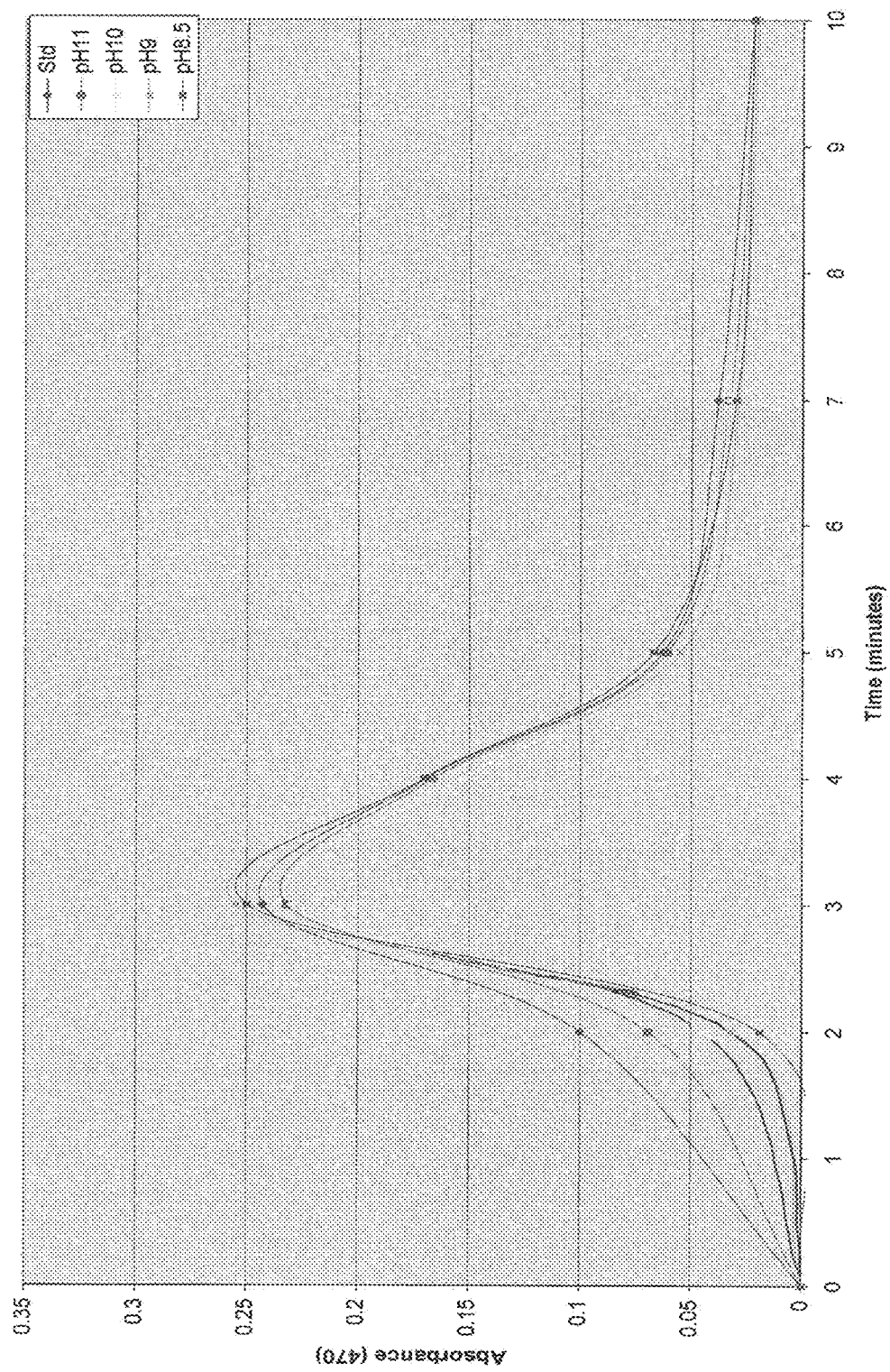
FIG. 3 shows the addition of $CO_2$ has no significant effect on the cure rates of binder compositions.

FIG. 3 the addition of $CO_2$ has no significant effect on the cure rates of binder compositions.

Figure 4:
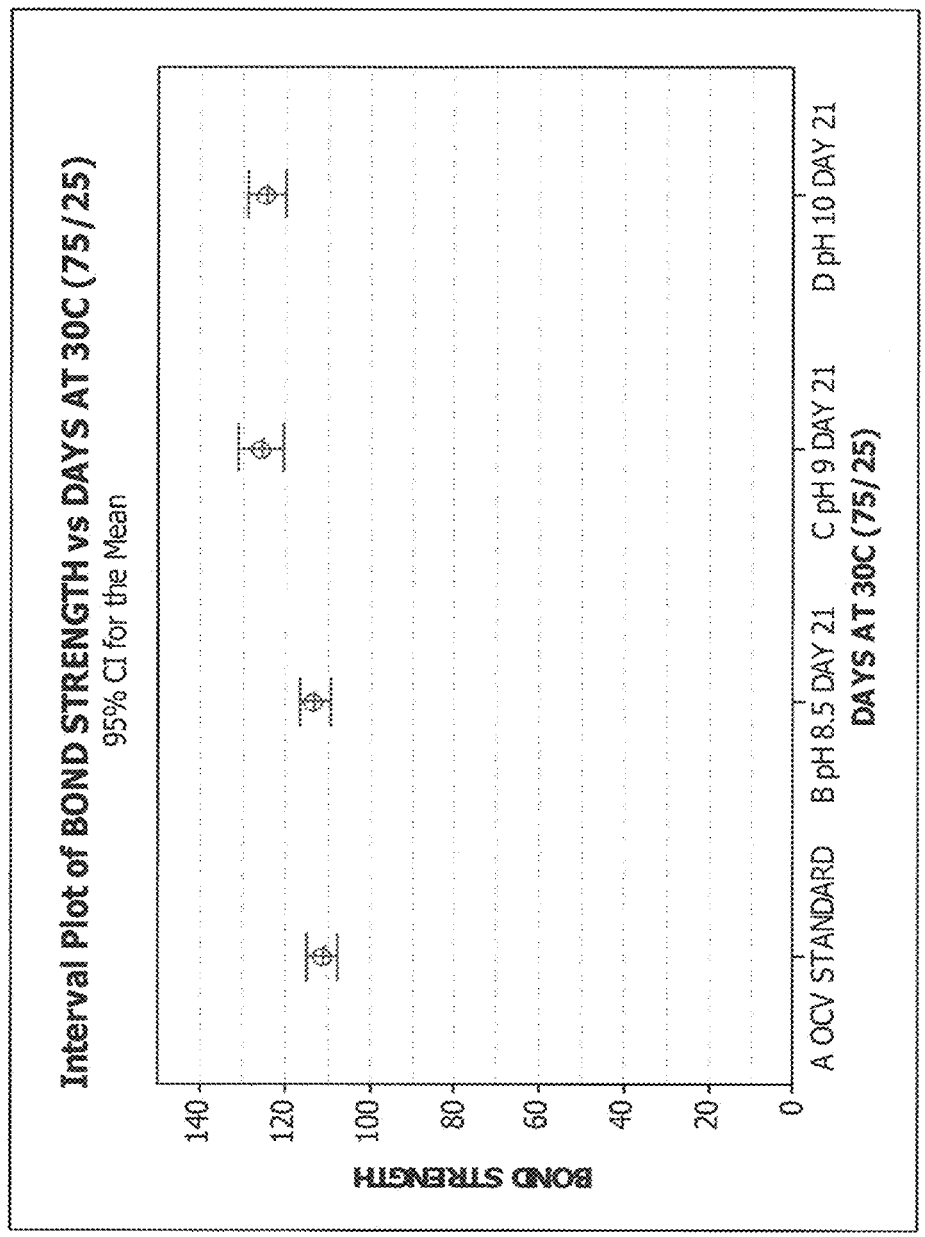
FIG. 4 shows the addition of $CO_2$ has no significant effect on the bond strength.

FIG. 4 the addition of $CO_2$ has no significant effect on the bond strength.

The present invention will be further illustrated in the following examples, without limitation thereto.

Example 1: Binder Composition of Glucose/Fructose and HMDA (75%/25%) and Carbon Dioxide A carbohydrate component composed of 50 w % glucose and 50 w % fructose was dissolved in water and mixed with a corresponding amount of HMDA (hexamethylenediamine) in aqueous solution, under atmospheric pressure, in order to produce 500 g binder solution comprising 75% w carbohydrate and 25% w HMDA, and 37.5% solids (pure glucose required: 70.3125 g, pure fructose required: 70.3125 g, pure HMDA required: 46.875 g). Whilst under mild agitation, the pH is constantly monitored for the first 20 minutes. The pH dropped from 11.82 to 11.4 of its own accord. A first 50 g samples is taken at that point in time.

Carbon dioxide was then bubbled into the remaining 450 g binder solution at a slow rate for approx. 30 min. Further 50 gram samples were removed and bottled when the binder solution showed a pH of 11, 10, 9 and 8.5, respectively. An increase in binder temperature of 3-4° C. was observed during the experiment.

| | CO2 efficiency | | | |
|---|---|---|---|---|
| | pH | CO2 used (g) | Binder weight increase (g) | % CO2 utilized |
| Starting pH | 11.58 | | | |
| pH 11 | 11 | 9.5 | 7.19 | 75.68% |

-continued

| CO2 efficiency | | | | |
|---|---|---|---|---|
| | pH | CO2 used (g) | Binder weight increase (g) | % CO2 utilized |
| pH 10 | 10 | 21.89 | 15.08 | 68.89% |
| pH 9.5 | 9.5 | 31 | 18.54 | 59.81% |

All five samples were left in a water bath at 30° C. and tested over the course of 3 weeks to monitor changes in shelf life, by way of cure rate, viscosity, browning and bond strength.

Viscosity was measured using an LV-Torque Brookfield Viscosimeter, spindle LV63 at 60 rpm (for example).

FIG. 1 clearly shows that for the samples treated with carbon dioxide the viscosity increases significantly later than for the sample that has not been treated with carbon dioxide. From these results, it can be concluded that self-curing leading to increased viscosity is significantly delayed, in this test by more than 2 weeks. Shelf-life hence is increased concomitantly.

Browning was measured by IR absorbance (visible) at 470 nm.

FIG. 2 clearly shows that browning of $CO_2$-treated samples is significantly slower than non-treated sample.

Curing of Binders:
To follow cure rates, drops of binder were placed on glass fibre filters and cured for various times. The cured spots were extracted into water and the absorbance of the leachate measured using a spectrophotometer. Absorbance rose initially owing to the formation of soluble coloured compounds. The absorbance then fell due to the cross linking of these soluble compounds. The cure speed is considered to be the time taken for the absorbance to fall to the minimum value.

As shown in FIG. 3, the cure rate of all samples is essentially unaffected by the carbon dioxide treatment of the binder samples.

Bonding strength was measured via a standard glass veil tensile test method.

As can be seen in FIG. 4, the bonding strength is not substantially affected or may even be slightly improved when the invention binder samples are treated with carbon dioxide.

Example 2: Binder Composition of Dextrose and HMDA Carbamate

Further work has been carried out on a binder composition based on dextrose and a commercial carbamate of HMDA (Vucofac HMDAC by Safic Alcan). The HMDA carbamate was dissolved in water until saturation (approx. 30% wt) before adding the carbohydrate component (a high fructose corn syrup at a glucose:fructose ratio of 58:42 by Cargill) 1 to form a 37.5% solids aqueous binder composition comprising 75 wt % carbohydrate and 25 wt % HMDA carbamate. Shelf live was tested as per Example 1 in comparison with a standard HMDA binder composition at 37.5% solids (same carbohydrate component but HMDA instead of HMDA carbamate, at same ratio).

| Standard HMDA binder | HMDA carbamate binder |
|---|---|
| 34 days | 229 days |

Clearly, the carbamate derivative of the amine component in the binder composition significantly improves shelf live of the composition, meaning self-polymerization being significantly delayed.

Example 3: Binder Composition of HFCS and Tri-Amino Nonane Carbamate

The carbohydrate component (high fructose corn syrup with a glucose:fructose ratio of 58:42) was dissolved in water and mixed with a corresponding amount of 4-(aminomethyl)-1,8-octanediamine (TAN) in aqueous solution, under atmospheric pressure, to form a 37.5 solids composition comprising 75 wt % carbohydrate and 25 wt % TAN. Whilst under mild agitation, the pH is constantly monitored for the first 20 minutes. The pH dropped to 11.59 of its own accord. A first 50 g samples is taken at that point in time.

Carbon dioxide was then bubbled through the remaining binder solution at a slow rate for approx. up to 178 minutes. Further 50 gram samples were removed and bottled when the binder solution showed a pH of 11, 10, and 9, respectively. No significant increase in binder temperature was observed during the experiment.

| pH | Time (min) | Temperature (C°) | $CO_2$ used |
|---|---|---|---|
| 11.59 | 0 | 25 | 0 g |
| 11 | 65 | 24 | 15.03 g |
| 10 | 98 | 24 | 41.40 g |
| 9 | 178 | 24 | 91.97 g |

It has been found that the cure rates were not significantly affected by the carbamate formation. The completion of cure occurred between 5 and 6 minutes and the curing curves were very similar for all pH values. For the test method, refer to Example 1.

The relevant samples were left in humidity cabinet set at 30° C. and shelf live was monitored over time, in accordance with the methodology of Example 1.

| Sample 1 pH 11.59 | sample 2 pH 11 | sample 3 pH 10 | sample 4 pH 9 |
|---|---|---|---|
| 6 days | 9 days | 23 days | 49 days |

The invention claimed is:
1. A method of manufacturing a collection of matter bound by a polymeric binder comprising the steps:
  (i) providing a collection of matter,
  (ii) providing a water-soluble, curable, thermosetting binder composition, comprising:
    at least one carbohydrate component, wherein the at least one carbohydrate component comprises a reducing sugar and/or a component which yields a reducing sugar in situ, and
    at least one carbon dioxide reaction product comprising at least the reaction product(s) of carbon dioxide with at least one nitrogen-containing component, wherein the at least one nitrogen-containing component comprises an organic amine comprising at least one primary amine group as well as salts thereof,
  in a solvent to obtain a solution or dispersion,
  wherein the weight ratio between the carbohydrate component(s) and the carbon dioxide reaction product(s) with the nitrogen-containing component(s) is 0.5:1 to 30:1,

(iii) applying the solution or dispersion obtained in step (ii) to the collection of matter, and
(iv) applying energy to the collection of matter containing said solution or dispersion to cure the binder composition.

2. The method according to claim 1, in which the viscosity of an aqueous solution containing 70 wt.-% of said binder composition does not increase by more than 500 cP when left to stand at 20° C. for 12 hours.

3. The method according to claim 1, wherein said binder composition is capable of reacting with a crosslinker to yield one or more melanoidins as a water-insoluble composition, under relevant curing conditions.

4. The method according to claim 1, wherein the ratio of total carbonyl groups in the carbohydrate component(s) to total reactive nitrogen-containing groups in the nitrogen-containing component(s) is 5:1 to 1:5.

5. The method according to claim 1, wherein the at least one carbohydrate component is selected from the group consisting of monosaccharides, disaccharides, and polysaccharides or a reaction product thereof.

6. The method according to claim 1, wherein the at least one carbohydrate component is selected from the group consisting of ribose, arabinose, xylose, lyxose, glucose (dextrose), mannose, galactose, allose, altrose, talose, gulose, idose, fructose, psicose, sorbose, dihydroxyacetone, sucrose and tagatose, as well as mixtures thereof.

7. The method according to claim 1, wherein the at least one nitrogen-containing component comprises a primary polyamine having the formula $H_2N-Q-NH_2$, wherein Q is a $C_6$ alkyl or cyclohexyl, cyclopentyl or cyclobutyl, or benzyl, each of which being optionally substituted with amino, aminoalkyl, hydroxyl, halo, or thiol, wherein alkyl is selected from the group consisting of $C_2$-$C_{24}$ alkyl, $C_2$-$C_9$ alkyl, and $C_3$-$C_7$ alkyl.

8. The method according to claim 1, wherein in step (ii) a crosslinker is added to the binder composition.

9. The method according to claim 1, wherein prior to the step of applying the solution or dispersion obtained in step (ii) to the collection of matter, the collection of matter is substantially free of binder.

10. A method of manufacturing a collection of matter bound by a polymeric binder comprising the steps:
(i) providing a collection of matter,
(ii) providing a water-soluble, curable, thermosetting binder composition, in a solvent to obtain a solution or dispersion, wherein the binder composition is obtained by a method comprising the steps of:
(a) providing at least one carbohydrate component, wherein the at least one carbohydrate component comprises a reducing sugar and/or a component which yields a reducing sugar in situ,
(b) providing at least one nitrogen-containing component, wherein the at least one nitrogen-containing component comprises an organic amine comprising at least one primary amine group as well as salts thereof,
(c) providing carbon dioxide,
(d) mixing in a solvent the carbohydrate component(s) and the nitrogen-containing component(s), and optionally cooling at room temperature, and
(e) bubbling carbon dioxide into the mixture obtained in step (d),
wherein the weight ratio between the carbohydrate component(s) and the carbon dioxide reaction product(s) with the nitrogen-containing component(s) is 0.5:1 to 30:1;
or
(a') providing at least one carbohydrate component, wherein the at least one carbohydrate component comprises a reducing sugar and/or a component which yields a reducing sugar in situ,
(b') providing at least one nitrogen-containing component, wherein the at least one nitrogen-containing component comprises an organic amine comprising at least one primary amine group as well as salts thereof,
(c') providing carbon dioxide,
(d') reacting the carbon dioxide with the nitrogen-containing component(s), and
(e') mixing in a solvent the carbohydrate component(s) and the reaction product(s) of (d'),
wherein the weight ratio between the carbohydrate component(s) and the carbon dioxide reaction product(s) with the nitrogen-containing component(s) is 0.5:1 to 30:1,
(iii) applying the solution or dispersion obtained in step (ii) to the collection of matter, and
(iv) applying energy to the collection of matter containing said solution or dispersion to cure the binder composition.

11. The method according to claim 10, in which the viscosity of an aqueous solution containing 70 wt.-% of said binder composition does not increase by more than 500 cP when left to stand at 20° C. for 12 hours.

12. The method according to claim 10, wherein in step (ii) a crosslinker is added to the binder composition.

13. The method according to claim 10, wherein the ratio of total carbonyl groups in the carbohydrate component(s) to total reactive nitrogen-containing groups in the nitrogen-containing component(s) is 5:1 to 1:5.

14. The method according to claim 10, wherein the at least one carbohydrate component is selected from the group consisting of monosaccharides, disaccharides, and polysaccharides or a reaction product thereof.

15. The method according to claim 10, wherein the at least one carbohydrate component is selected from the group consisting of ribose, arabinose, xylose, lyxose, glucose (dextrose), mannose, galactose, allose, altrose, talose, gulose, idose, fructose, psicose, sorbose, dihydroxyacetone, sucrose and tagatose, as well as mixtures thereof.

16. The method according to claim 10, wherein the at least one nitrogen-containing component comprises a primary polyamine having the formula $H_2N-Q-NH_2$, wherein Q is a $C_6$ alkyl or cyclohexyl, cyclopentyl or cyclobutyl, or benzyl, each of which being optionally substituted with amino, aminoalkyl, hydroxyl, halo, or thiol, wherein alkyl is selected from the group consisting of $C_2$-$C_{24}$ alkyl, $C_2$-$C_9$ alkyl, and $C_3$-$C_7$ alkyl.

17. The method according to claim 10, wherein prior to the step of applying the solution or dispersion obtained in step (ii) to the collection of matter, the collection of matter is substantially free of binder.

* * * * *